(No Model.) 4 Sheets—Sheet 1.
J. M. GARDNER.
MACHINE FOR BOLLING AND CLEANING COTTON.
No. 556,179. Patented Mar. 10, 1896.
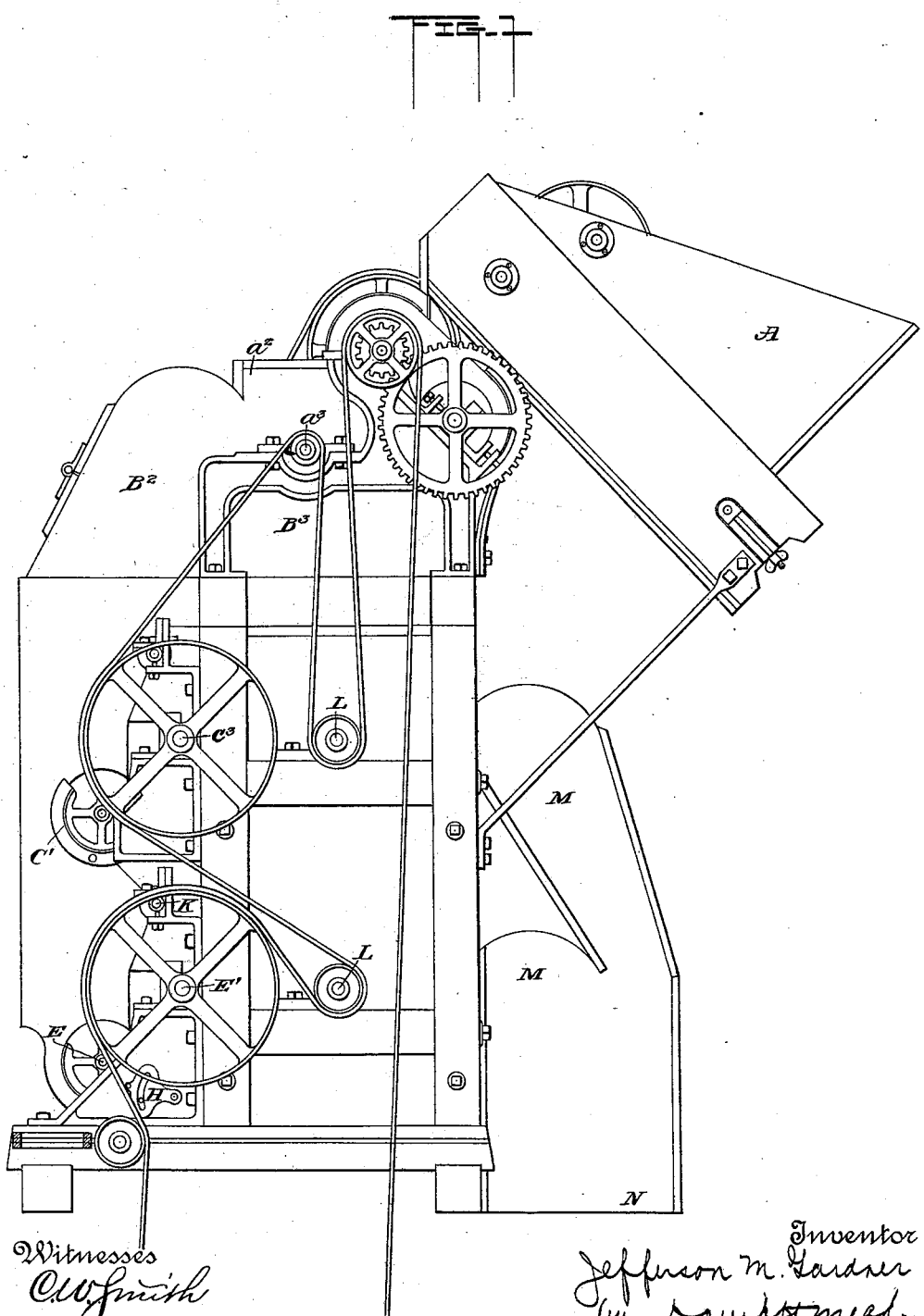

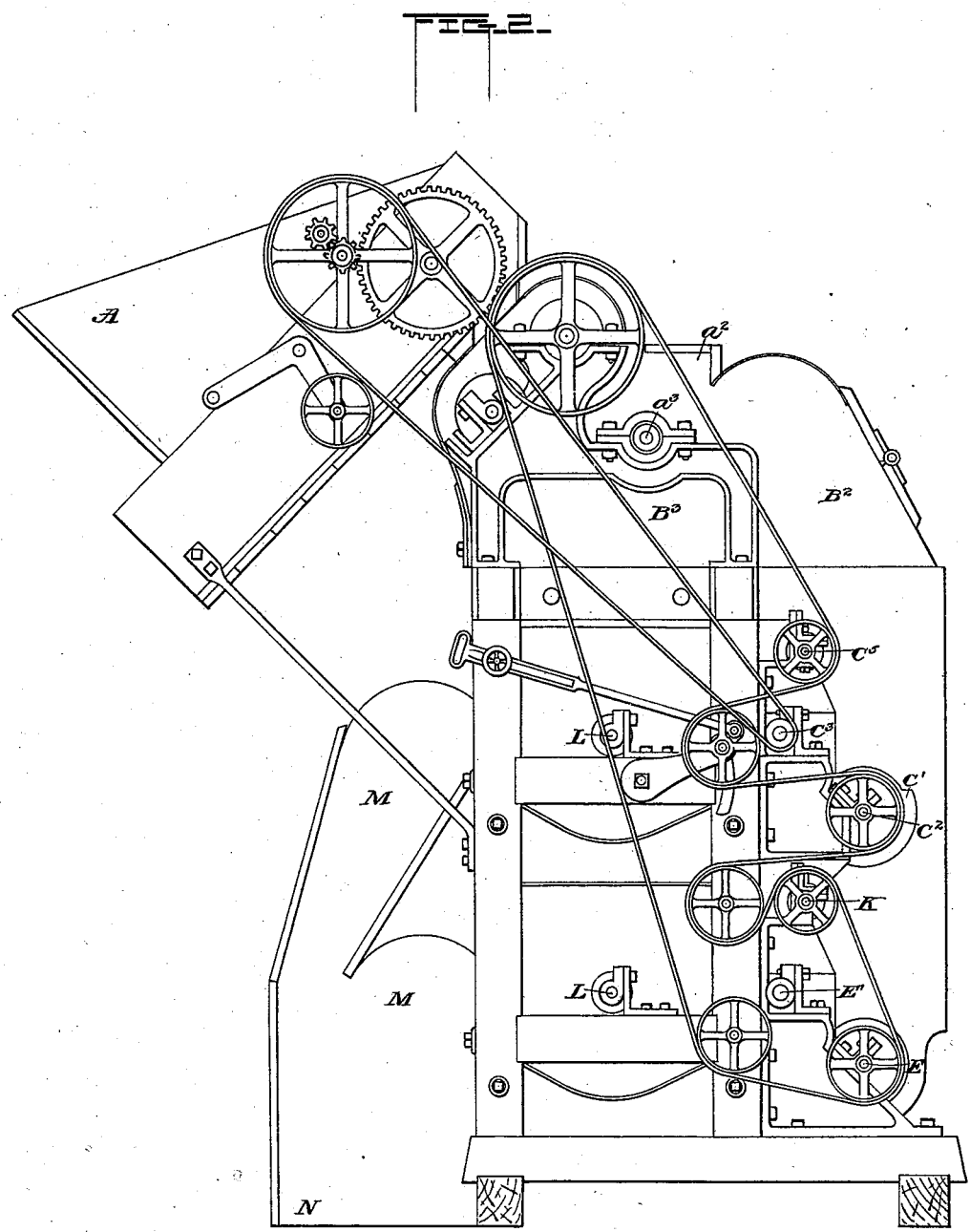

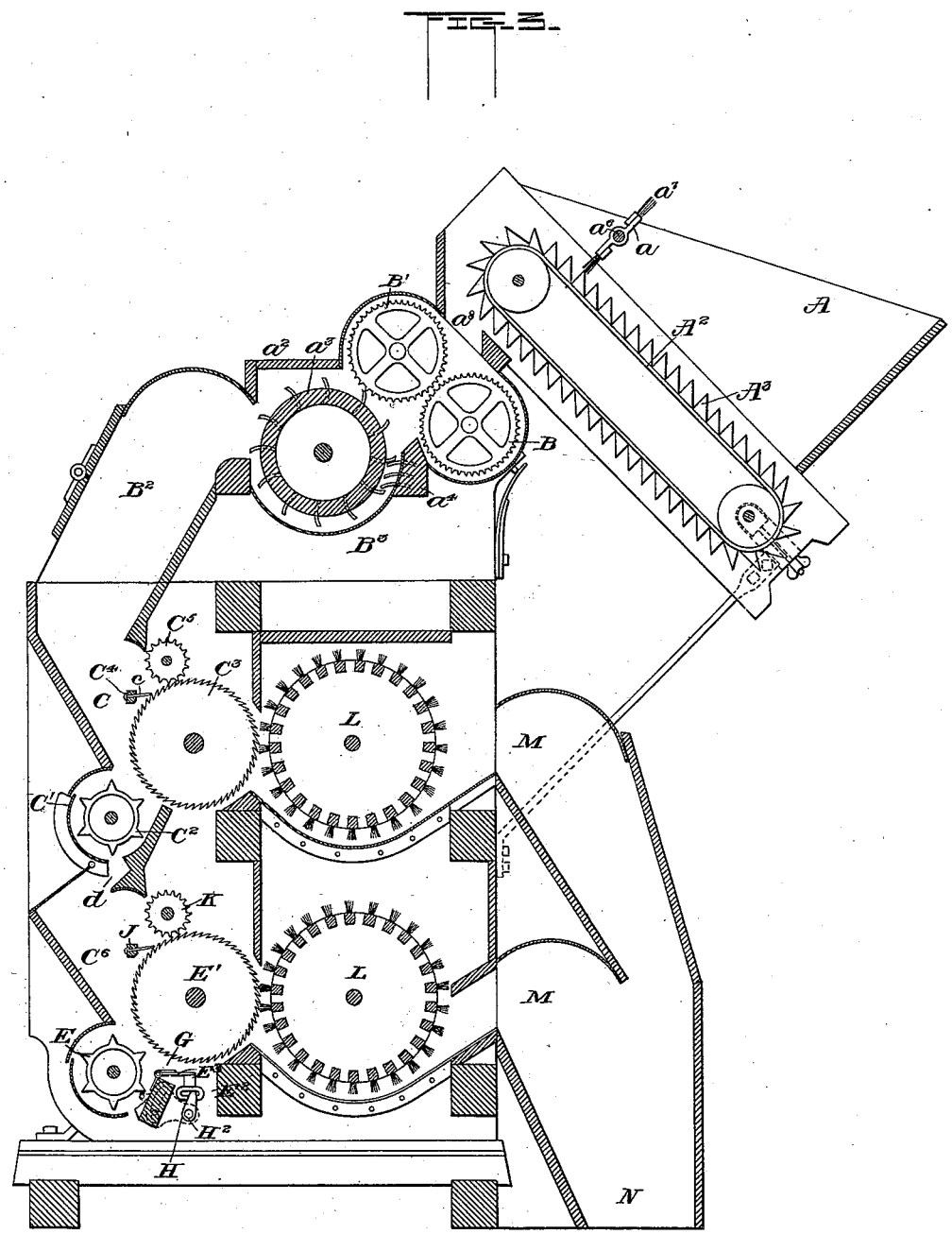

(No Model.) 4 Sheets—Sheet 4.
J. M. GARDNER.
MACHINE FOR BOLLING AND CLEANING COTTON.
No. 556,179. Patented Mar. 10, 1896.
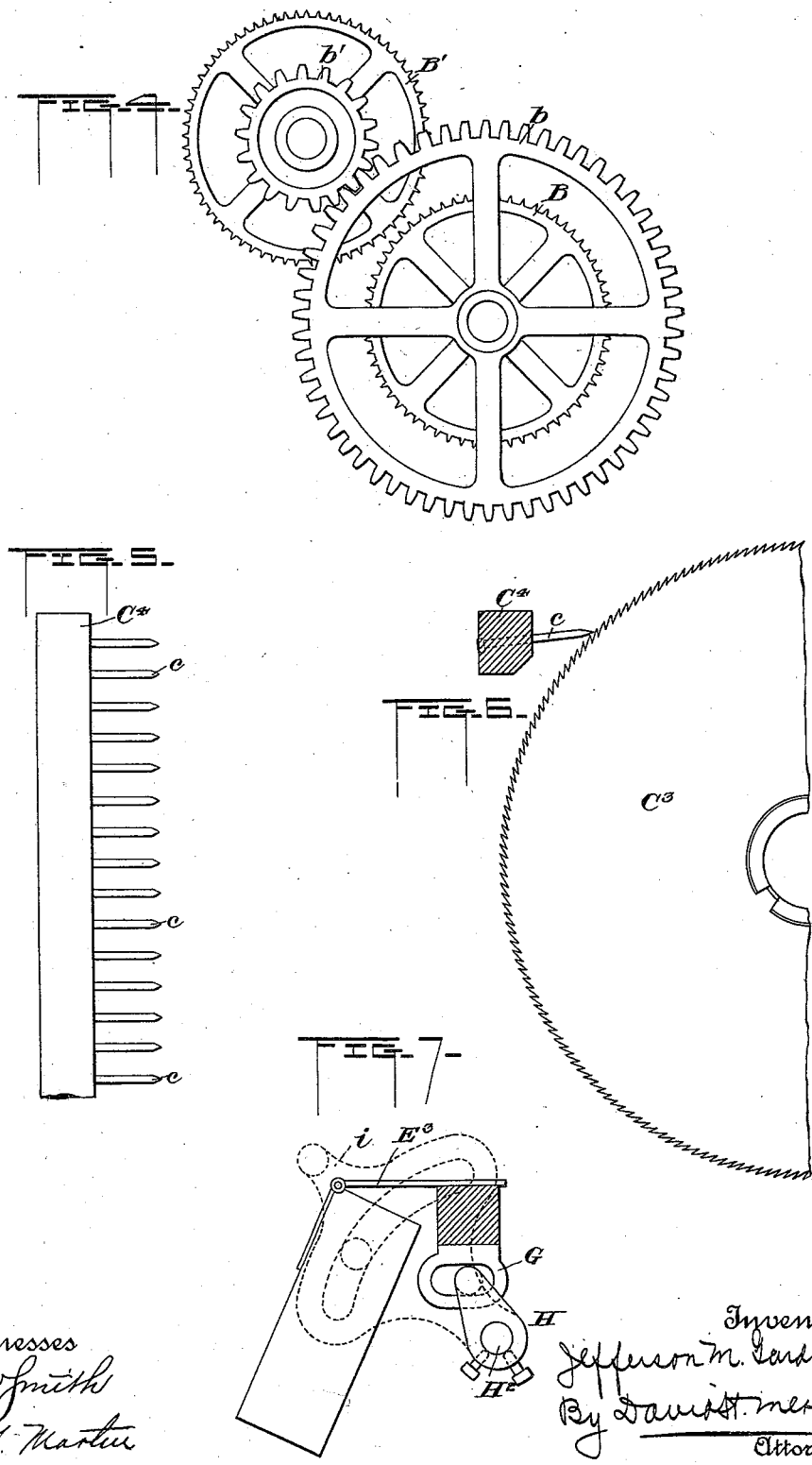
Witnesses
C. W. Smith
L. G. Martin
Inventor
Jefferson M. Gardner
By David H. Mead
Attorney

UNITED STATES PATENT OFFICE.

JEFFERSON M. GARDNER, OF NASHVILLE, TENNESSEE.

MACHINE FOR BOLLING AND CLEANING COTTON.

SPECIFICATION forming part of Letters Patent No. 556,179, dated March 10, 1896.

Application filed December 22, 1894. Serial No. 532,711. (No model.)

*To all whom it may concern:*

Be it known that I, JEFFERSON M. GARDNER, a citizen of the United States, residing at Nashville, in the county of Davidson and State of Tennessee, have invented a certain new and useful Improvement in Machines for Bolling and Cleaning Cotton; and I do hereby declare the following to be a full, clear, and exact description of the invention, such as will enable others skilled in the art to which it appertains to make and use the same.

This invention relates to machines for separating cotton from its bolls and for freeing it from dust, dirt, and other foreign substances.

The object of the invention is to produce a cotton-cleaner so constructed that the cotton may be rapidly extracted from the bolls, thus allowing cotton to be picked in the bolls and be separated from them by machinery with great saving of time over the usual way of picking the cotton from the bolls in the field, or of picking the cotton from the bolls by hand after they have been gathered.

Further, the object of the invention is to produce a cotton-cleaner whereby cotton may be separated from bolls and from dust, dirt, and other foreign substances, and whereby the cotton, the dust and the like, and the bolls may be discharged separately.

The invention consists of a cotton-cleaner comprising two or more saw-cylinders, arranged one above the other, and two or more bars, one arranged adjacent to each saw-cylinder and having teeth or pins extending between the saws, whereby the cotton is pressed against the saws to insure its being stripped from the bolls.

Further, the invention consists in a cotton-cleaner comprising two or more saw-cylinders arranged one above the other, rapidly-revolving toothed rollers arranged adjacent to the saw-cylinders, the teeth of the rollers passing between the saws to prevent the bolls from being carried with the cotton, and bars having teeth or pins extending between the saws, whereby the cotton is pressed against the saws.

Further, the invention consists of a cotton bolling and cleaning machine comprising two or more saw-cylinders arranged one above the other, toothed cylinders for projecting the cotton and bolls against the saw-cylinders, and openings beneath the saw-cylinders, the opening beneath the lower saw-cylinder being provided with means for regulating its size.

Further, the invention consists in a cotton-cleaner comprising crushing-rolls, a thrashing-cylinder, two or more saw-cylinders arranged one above the other, rapidly-revolving toothed rollers arranged adjacent to each saw-cylinder, the toothed cylinders being arranged in casings having openings adjacent to the saws, and the casing of each chamber having a movable bottom, and a discharge-opening beneath the lower saw-cylinder for discharging the bolls after the cotton has been separated from them, the discharge-opening being provided with means for regulating its size; and, finally, the invention resides in various novel details of construction whereby the objects of the invention are attained and the effectiveness of the machine assured.

The invention is illustrated in the accompanying drawings, in which—

Figures 1 and 2 are side elevations of a machine constructed in accordance with my invention, the views being taken from opposite sides of the machine. Fig. 3 is a longitudinal vertical section of the machine. Fig. 4 is a side elevation showing the crushing-rolls and the gearing by which they are operated. Fig. 5 is a plan view of the bar having fingers between the saws. Fig. 6 is a side view showing the relative arrangement of the saws and the fingers of the bar shown in Fig. 5, and Fig. 7 is a detail view showing the means for regulating the opening for the discharge of the bolls from the lower saw-cylinder.

In the drawings, A represents the hopper, into which cotton to be cleaned is placed, and $A^2$ represents an endless belt provided with the slats $A^3$ having projections, whereby the cotton is engaged and carried up and under a leveler $a$. This leveler is mounted on a revolving shaft $a^6$ and is provided with brushes $a^7$. The distance from the shaft at which the brushes are placed governs the quantity of cotton permitted to be carried by the conveyer.

Rolls B B' are mounted beneath the discharge-opening $a^8$, and the cotton, bolls, &c., received from the hopper A pass between them. The rolls B B' are geared together, the roll B having a gear $b$ meshing with the pinion $b'$ of the roll B', giving different speeds of the rolls to produce a crushing and scouring effect on the bolls, &c., passed between them.

The cotton, bolls, &c., pass from the rolls B B' to a chamber $a^2$, wherein is mounted a thrashing-cylinder $a^3$ arranged to revolve rapidly. The thrashing-cylinder $a^3$ is provided with teeth, and a concave $a^4$ at the side of the chamber $a^2$ is also provided with teeth. The cotton, &c., is carried between the teeth of the cylinder and those of the concave, and the cotton is loosened from the bolls, and any dirt or other foreign substances carried by or contained by the bolls is liberated. The bottom of the chamber $a^2$ is formed of perforated metal, slats, or the like, and arranged beneath the cylinder is a chamber $B^3$, which receives the dirt and the like freed from the cotton and driven through the perforated bottom of the chamber by the action of the rapidly-revolving thrashing-cylinder. From the chamber $a^2$ the cotton passes downward through a passage $B^2$ to a chamber C, the lower portion of which chamber is formed by the casing C'. The casing C' is perforated to allow escape of dust. Mounted in the chamber C is a toothed cylinder $C^2$, by which the cotton and bolls are caught and carried around rapidly and are thrown out at each revolution against the teeth of the saws mounted on the saw-cylinder $C^3$.

In the upper portion of the chamber C is a finger-bar $C^4$, which extends the entire length of the saw-cylinder $C^3$. The fingers $c$ of the bar $C^4$ are so arranged as to project between the saws, and thus to press the cotton passed between the fingers and the saws closely against the saws, insuring its being engaged by the saws. Immediately above and a short distance back of the finger-bar $C^4$ is a toothed cylinder $C^5$. The teeth on this cylinder are so arranged as to allow a series of teeth to project between adjacent saws of the saw-cylinder. The toothed cylinder rotates in the same direction as the saw-cylinder, so that the passage of bolls between the saws with the cotton is prevented.

The cylinder $C^5$ is run at a higher rate of speed than the saw-cylinder and is arranged to engage bolls and the like carried by the saws, and to throw them from the saws, allowing the cotton to be drawn from them by the saws.

The lower part of the casing C' is preferably perforated to permit the escape of dirt from the machine, and at its inner end is a small opening $d$, leading to a chamber $C^6$ below it. The operation of the cylinder $C^2$ is to throw the cotton and bolls against the saws so long as either remain in the chamber C. The volume of cotton, &c., is rapidly reduced by the action of the saws, and the material not engaged by the saws passes through the opening $d$ to the lower chamber $C^6$.

In the lower chamber $C^3$ is a cylinder E, provided with teeth and corresponding to the cylinder $C^2$ in the upper chamber. The purpose of the cylinder E is to throw cotton and bolls received from the upper chamber against the saws of the revolving saw-cylinder E', the operation of which is the same as those of the upper chamber, until all the cotton has been separated from the bolls. As the bolls are freed from the cotton, they are thrown through the opening $E^2$. This opening may be increased or diminished as the case may require by means of the hinged valve or door $E^3$. This valve or door has attached to it slotted plates G, which receive small cranks H. These cranks are hung on a rod $H^2$, which extends the entire length of the chamber $C^3$. The rod has its bearings in suitable openings in each of the side walls of the chamber, and one end has secured to it the slotted adjustable lever $i$. By the use of the slotted plates G, cranks H, secured to rod $H^2$, and lever $i$ the rear part of valve $E^3$ may be raised or lowered.

If it is desired to discharge the bolls from which the cotton has been separated more rapidly, the space between the valve and the saws E' may be increased by lowering the valve. The opening should not, however, be allowed to become too large, as in this case cotton would pass out before having been thoroughly acted upon by the saws.

The proper operation and regulation of the valve $E^3$ has a material effect on the proper and economical operation of the machine. The cotton and bolls are thrown with great force by the cylinder E against the saws on the saw-cylinder E', and as long as there remains any cotton in the chamber it will be pressed by the fingers of the bar J against the saws in a manner to insure its being caught by the saws. At the same time the cylinder K, whose projections pass between the saws, prevents the passage of bolls between the saws. As the bolls are entirely freed from the cotton, they are thrown through the opening $E^2$, and thus discharged from the machine.

In the rear of each of the saw-cylinders $C^3$ and E' are brush-cylinders L, which are rotated at a high rate of speed in the opposite direction to the saw-cylinders. They are arranged in such positions relative to the saw-cylinders as to engage the cotton carried by the saws and free it from them. The cotton thus engaged is discharged through the passages M M to a common outlet N.

Having thus described my invention, what I claim as new, and desire to secure by Letters Patent, is—

1. A cotton bolling and cleaning machine comprising two or more saw-cylinders, arranged one above the other, rapidly-revolving toothed rollers arranged adjacent to the saws, and having their teeth projecting between the saws, and bars parallel to the axis of the saws, and having fingers projecting between the saws, substantially as described.

2. A cotton bolling and cleaning machine comprising two or more chambers arranged one above the other, revolving saw-cylinders arranged in the chambers, toothed rollers arranged in the lower portions of the chambers, and designed to project the cotton, bolls, and the like, against the saw-cylinders, toothed rolls mounted adjacent to the saw-cylinders and having their teeth projecting between the saws, the rolls being revolved in the same direction as the saw-cylinders, but at a higher rate of speed, and a bar parallel to the axis of the saws, and having fingers projecting between the saws, the bar and fingers being arranged between the point of inlet of the cotton and the saw-cylinders, substantially as described.

3. A cotton bolling and cleaning machine comprising crushing-rolls arranged adjacent to the feed of the machine the rolls being run at different speeds, two or more chambers arranged one above the other, revolving saw-cylinders arranged in the chambers, toothed rollers arranged in the lower portions of the chambers, and designed to project the cotton, bolls, and the like, against the saw-cylinders, toothed rolls mounted adjacent to the saw-cylinders and having their teeth projecting between the saws, the rolls being revolved in the same direction as the saw-cylinders, but at a higher rate of speed, and a bar parallel to the axis of the saws, and having fingers projecting between the saws, the bar and fingers being arranged between the point of inlet of the cotton and the saw-cylinders, substantially as described.

4. A cotton bolling and cleaning machine comprising two or more saw-cylinders arranged one above the other, toothed cylinders for projecting the cotton and bolls against the saws and outlets beneath the saws, the outlet beneath the bottom saw-cylinder being provided with means for regulating its size, substantially as described.

5. A cotton bolling and cleaning machine comprising crushing-rolls, a thrashing-cylinder, two or more saw-cylinders arranged one above the other, toothed cylinders for projecting the cotton and bolls against the saws, casings for receiving the toothed cylinders, openings in the casings, and a valve arranged in the opening in the lower casing, substantially as described.

In testimony whereof I affix my signature in presence of two witnesses.

JEFFERSON M. GARDNER.

Witnesses:
EDWARD T. BROWN,
GEORGE COLFAX.